Patented May 2, 1933

1,906,749

UNITED STATES PATENT OFFICE

RUDOLPH R. GRANT, OF DAYTON, OHIO, ASSIGNOR TO THE BLUE ROCK CHEMICAL CORPORATION OF VIRGINIA, OF NORFOLK, VIRGINIA

SEALING COMPOSITION

No Drawing. Application filed February 19, 1931. Serial No. 517,101.

This invention relates to a sealing composition particularly suitable for tightly closing joints of machinery or other apparatus in which it is required to stop flow or leakage of fluids or gases, and further relates to a process of preparing this composition. This composition is especially adapted for use in the assembly and maintenance of internal combustion and steam engines and other fluid or gas pressure motors or pumps as well as in other machinery involving fluid, gas or steam tight joints.

Most substances which have been used previously for similar purposes are found to have one or more disadvantageous qualities or properties which have materially detracted from their usefulness. Some of these substances are found to become hard and brittle upon more or less extended exposure to the atmosphere. This necessitates that the container in which it is kept be airtight and kept closed except when opened for use. Furthermore the joint or seam to which it is applied must be assembled to exclude the air before the substance hardens. Other substances are affected by heat or cold in one way or another. Others will break down or dissolve in contact with various common solvents to which they are likely to become exposed. Still others have the property of setting or cementing even when in use out of contact with air, thus interfering with the ready disassembly and re-assembly of the parts to which it is applied. After this type of substance has become hard in a sealed joint, it is apt to be cracked by vibrations or shocks and permit leakage.

The present invention overcomes the aforementioned difficulties by providing a sealing composition which remains in the desired semi-fluid or plastic conditions practically indefinitely when either exposed to air or in use out of contact with air. It is practically unaffected in viscosity by different temperatures to which it is likely to be subjected in use. It is insoluble in and unaffected by water, steam, alcohol, glycerine, lubricating oil and many other common solvents. The effect of gasoline on the composition is so slight that its use for tightly sealing the cylinder head gasket of a gasoline engine is highly satisfactory. The characteristics of the composition also render it highly efficient for sealing many other joints having slight irregularities of surface either alone or in conjunction with gaskets, such as steam pipe joint flanges, pump and valve packing, internal combustion engine crank case housing and cylinder block joints, and engine valve cover plates.

While a satisfactory composition has been prepared by the following process, it is to be understood that the invention is not limited to the exact materials, proportions or process of preparation except as specified in the appended claims.

A non-drying oil as classified by the Chemical Technology and Analysis of Oils, Fats and Waxes, by Dr. J. Lewkowitsch M. A. F. I. C., sixth edition, published by McMillan & Co., Ltd., London, that is to say an oil that does not become hard or gummy upon exposure to the atmosphere at ordinary temperature, is prepared by heating to a temperature at which slow polymerization takes place and while maintained at this temperature is blown with air until the desired specific gravity is reached. The temperature and period of treatment will, of course, vary according to the oil used and the specific gravity desired. It is believed that during this treatment, partial polymerization and partial oxidation of the oil takes place. Castor oil has been found a desirable oil for this purpose but other non-drying oils may be used. When castor oil is used, it is brought to a temperature of between 150° and 200° C. and is blown with air until the desired specific gravity is reached. This should require from 2 to 4 hours. After this treatment, the oil is brought to a temperature of from 150° to 175° C. and to 60 parts by weight of oil is added five parts of aluminum oxide, $Al_2O_3$, and thoroughly mixed in a suitable machine. To this mixture is then added fifteen parts of finely divided mica and fifteen parts of short asbestos fiber, and this is thoroughly mixed. It is thought that further polymerization and possibly slight oxidation of the oil occurs while maintained at high temperature in the mixing step. The composition is then let cool and is ready for use.

While, in the example given herein, castor oil was specified, other similar non-drying oils may be used in its stead. Furthermore, other metallic oxides may be used in place of aluminum oxide, other mineral or vegetable or animal wool fibers may be substituted for asbestos and other inert mineral or vegetable fillers may be used instead of mica. Examples of fibrous materials which may be used in place of asbestos are cotton, remy, linen and hemp, or nitrated or acetated materials, principally of vegetable origin, such as paper, cellulose, etc.

As a modification of the mixing process, all of the mineral substances may be added to the prepared oil together, but it is preferred to add the aluminum oxide first as this procedure gives a product possessing greater insolubility. The period of final heating may be shortened by adding a small quantity of oxidizing agent, such as manganese dioxide. Furthermore, if sufficient polymerization and oxidation is effected in the initial heating and blowing step of the process, the mixing step may be performed at a lower temperature than that specified or even cold, but in this case the mixing will require a longer period. Great care must be exercised in processing the oil in order that the desired characteristics will be obtained.

For ordinary purposes the materials, proportions and process of preparation should be regulated so as to obtain a product in the form of a thick paste which can be readily applied to the parts of the seal without running or spreading. However, for special purposes the composition may be modified to some extent to suit the special purpose by modifications of the materials, proportions or process without departing from the spirit of this invention or the scope of the appended claims.

Having thus described my invention what I claim is—

1. A sealing composition comprising oxidized and polymerized castor oil aluminum oxide, mica and asbestos fibers.

2. A sealing composition comprising ground or divided mica, asbestos fiber and a binder containing oxidized polymerized castor oil.

3. A sealing composition comprising substantially 60 parts oxidized and polymerized castor oil, 5 parts aluminum oxide, 15 parts mica and 15 parts asbestos fiber.

4. A process of preparing a sealing composition comprising mixing aluminum oxide with polymerized, oxidized castor oil while at a temperature above 150° C. and thereafter mixing therewith finely divided mica and short fibered asbestos.

5. In a process of preparing a sealing composition the steps comprising mixing aluminum oxide with partially polymerized and oxidized castor oil while at polymerization temperature and thereafter mixing therewith mica and mineral fiber.

In testimony whereof I affix my signature.

RUDOLPH R. GRANT.